Sept. 4, 1951 W. A. KETAY 2,566,453
DISPLAY HATCHER
Filed Sept. 23, 1947 2 Sheets-Sheet 1

INVENTOR
Walter A. Ketay
BY
Emery, Varney, Whittemore &c.
ATTORNEYS

Sept. 4, 1951 — W. A. KETAY — 2,566,453
DISPLAY HATCHER
Filed Sept. 23, 1947 — 2 Sheets-Sheet 2

INVENTOR
Walter A. Ketay
BY
Emery, Varney, Whittemore & Dix
ATTORNEYS

Patented Sept. 4, 1951

2,566,453

UNITED STATES PATENT OFFICE 2,566,453

DISPLAY HATCHER

Walter A. Ketay, Huntington, N. Y.

Application September 23, 1947, Serial No. 775,652

8 Claims. (Cl. 119—37)

This invention has to do with a novel display hatcher for eggs. More particularly the invention relates to an improved device in which an observer may see animal life come into actual being from eggs. The novel display device is of improved construction which allows the observer to see and appreciate all stages of the actual hatching of an animal from an egg.

It is also a feature of this invention to provide in cooperation with a novel display hatcher that hatches eggs a sound amplifier so that the various noises, even of very low audibility, taking place within the hatcher or device will be clearly heard by the observers irrespective of whether they are standing close to the device or container or not.

It is one of the objects of the invention to provide a novel hatcher that has its top portion provided with a transparent covering element or member so that the eggs and the hatching thereof may be readily seen from any position around the device, whether the device is circular, square, rectangular or of any other shape. Thus, the various stages of the coming into being of animal life can be readily seen and appreciated. By having a plurality of trays of eggs in the improved hatcher, of different stages of hatching, one may quickly see the various stages of hatching.

It is a further object to provide an improved display hatcher that receives a set of chicken eggs on or about their eighteenth day of incubation and to carry the eggs through to hatching which is approximately the twenty-first day. This hatching is carried on in an improved and efficient manner and provides chicks with only a slight loss. The loss of chicks with this improved hatcher is very much lower than with any other known hatching device.

Further, the improved display hatcher is of novel construction and is provided with operating mechanisms for supplying properly heated and moistened or humidified air to the eggs being hatched, and to supply and circulate such air at a predetermined rate of flow and in preferred directions to efficiently accomplish the hatching.

It is a further feature of this invention to provide a chicken hatcher with several constructional advantageous features: such as a perforated tray for eggs so that the air moving will pass down around the eggs and through the perforations; such as a moisture holder, or pan of water, or other moisture holding product that allows the moving air to pass in contact therewith and some of the down from the chickens or animals is caught as well as absorbing a certain amount of moisture; such as providing a screen through which the moistened air passes to an air circulating fan which moves the air along, the screen entrapping more of the chicken-down; and such as providing a series of partitions between a plurality of egg trays held in the hatcher, and to have the partitions high enough to, most of the time, prevent hatched chicks from getting over into another tray. Other features of construction will be appreciated when reading the detail description given below.

A further feature of the invention is the addition of one tray of eggs into the hatcher and the taking out of another tray where the chicks have been hatched. Such an exchange or substitution of trays is readily accomplished by tipping or temporarily removing the top transparent portion of the hatcher. Usually this addition of a tray and a subtraction of a tray is made at the end of a predetermined time, usually once a day.

One of the substantial advantages of this improved invention is the provision of a hatcher with a transparent element or part allowing an observer to see the various stages of actual hatching of eggs and to have each of these stages present within eye range and to see and hear the various stages of breaking of the egg shells and to listen to the noises of the animals just born, they being chicks, ducks, turkeys or any other animals born from eggs.

The eggs introduced into the hatcher may be eggs of any animals and in the preferred device herein illustrated, the eggs are chicken eggs.

In the drawings which accompany this application,

Figure 1:
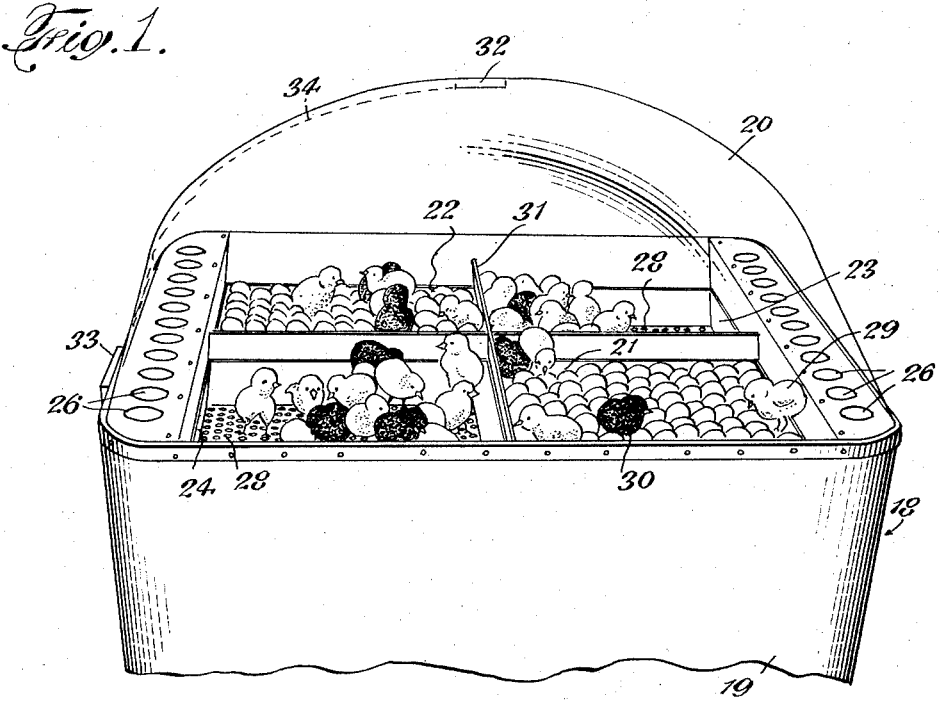
Fig. 1 is a perspective view of the upper part and a portion of the lower part of a display hatcher illustrating four trays of eggs or chicks and shows a transparent top element or member.

Referring now to these drawings, Fig. 1 provides a perspective view of an improved display container 18 comprising a lower portion 19 and a transparent element or upper portion 20. This display hatcher is of sufficient size to receive egg trays 21, 22, 23 and 24. Other size trays and additional or reduced numbers of trays may be employed, as desired.

Figure 2:
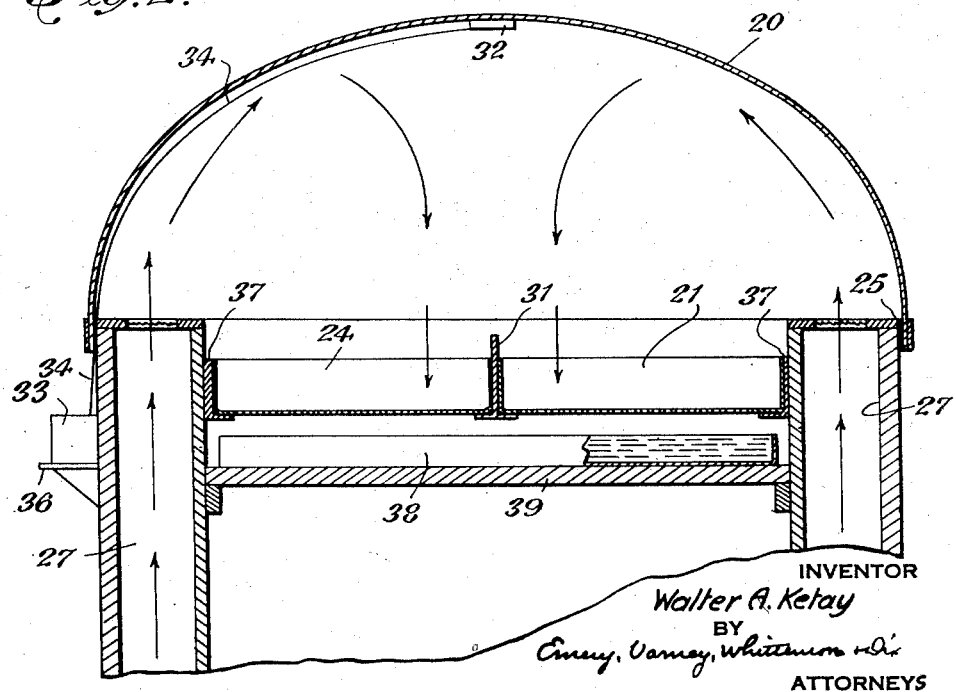
Fig. 2 is a vertical sectional view through the display hatcher showing egg trays, a moisture tray, and air ducts for the movement of heated air through the hatcher or device and its guidance by the transparent element down through the trays holding the eggs.
Figure 3:
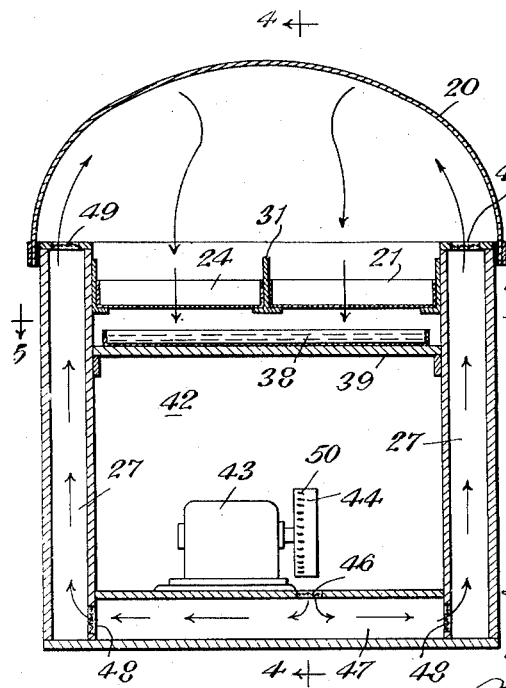
Fig. 3 is a view vertically through the complete hatcher, partly in section, illustrating structural features of the hatcher.

Carrying out the preferred function of this display hatcher, Fig. 1 shows the exit ends 26 of air ducts or passageways 27, Fig. 2, which allow heated air to rise to the transparent element 20, which guides the air down on to the eggs and between them and down through suitable perforations 28 in the trays and into the lower part 19 of the hatcher. It is preferred that these perforations 28 be approximately three sixteenths of an inch in diameter although this size acts as a guide.

Usually, a tray of eggs, for instance the tray 21, is added to the hatcher on one day, which preferably is the 18th day of incubation of the eggs, and that tray of eggs is submitted to the heated and moisturized or humidified air which comes out of the air passageways 27. These eggs, which in this instance are chicken eggs, will substantially complete hatching by the twenty first day, and the tray 24 shows the chicks. When a tray of eggs like tray 21 is added, tray 24 will be removed from the hatcher and the chicks shipped to desired points or be placed in brooders.

Referring again to Fig. 1 chicks 29 and 30 are shown on eggs in tray 21. Usually the chicks which have been hatched in tray 24 will not get over a partition 31 into another tray of eggs, but some chicks will accomplish such a travel. The partition 31 may be of any desired height but should not be of such a height than an observer cannot see the hatching into being of substantially all of the chicks.

In the preferred construction of a display hatcher, it is desired that the transparent element 20 is of good size and is positioned above the eggs so that observers can see all of the trays of eggs in the hatcher. For this purpose, the hatcher is constructed to have the lower portion 19 for receiving the trays of eggs substantially near the top thereof, and receives the transparent element 20 in engagement with the sides of the hatcher, and thereby allows observation from any point at any side of the hatcher. If desired, a rubber washer 25 may be employed to engage the lower portion 19 and the upper portion 20. When desired, the transparent element 20 may be made in one piece of material or may be made in several pieces set in a suitable frame provided on the top of lower portion 19 of the container. It is preferred, however, that the the transparent element fit substantially tightly onto the bottom or lower portion 19 of the container so that the air issuing from the air ducts or passageways will not flow to the outside of the hatcher but will be guided down onto and between the eggs into the lower part of the container.

In order that the observer may hear the various noises taking place by the chicks pecking at the shells in order to break the same, and the cracking of the shells, and the various noises of the chicks, a suitable radio pickup 32 and an amplifier 33 and the connecting wire 34 have been provided. The preferred form of pick-up and amplifier illustrated in Figs. 1 and 2 shows one means of accomplishing this result, but when desired, another form of pick-up and amplifier could be one instrument placed on the top of the transparent element 20 and be provided with a diaphragm opening in the transparent element. Any other form of amplifier can be employed when desired. In the structure shown, the amplifier 33 is supported on a suitable platform 36. The amplifier may be located at any desired position on or around the display hatcher.

Referring now to Figs. 2 to 5, the structure of the preferred form of display hatcher will be described and the main operating elements will be noted, but it is to be understood that other forms, shapes and sizes may be readily employed so long as the functions of the hatcher are performed.

In Fig. 2 it will be seen that the trays 21 and 24 are supported on suitable framework 37 which preferably is fastened to inner portions of lower part 19 of the hatcher. This framework will include the lower part of partition 31. A suitable moisture holder or unit, such as a wet cloth or burlap or other like material, or a pan of water 38 positioned on support 39, may be employed. The textile materials or the pan of water function to provide proper moisture to the air circulated within the display hatcher.

Figure 4:
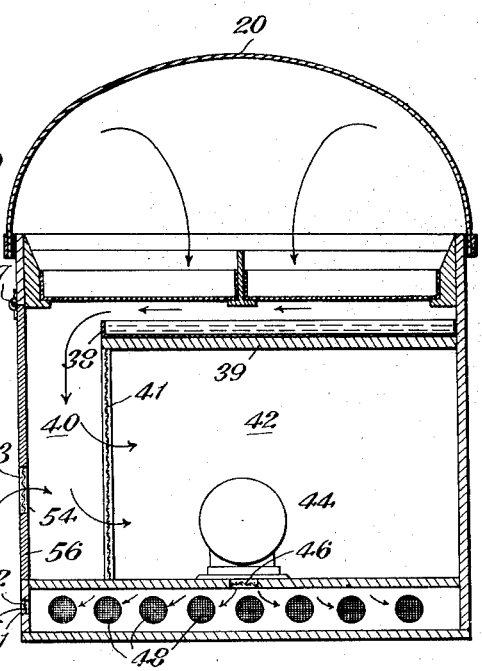
Fig. 4 is a sectional view taken on the lines 4—4 of Fig. 3.
Figure 5:
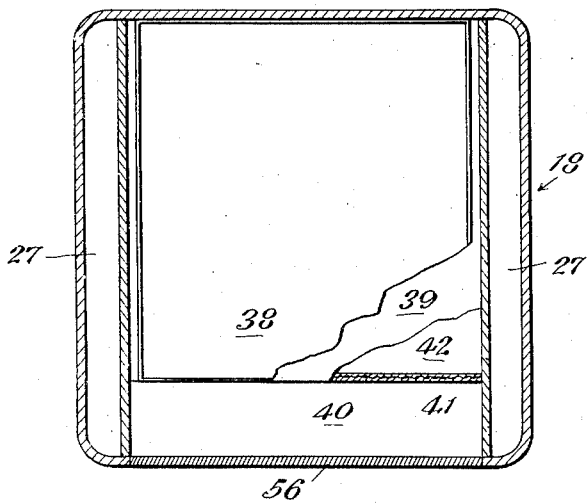
Fig. 5 is a sectional view taken on line 5—5 of Fig. 3.

In employing the pan of water, it will be noted in Fig. 4 that the warm air coming from the eggs passes through the perforations 28 and will strike the water in pan 38 and pass across the surface thereof and down channel 40 and through screen 41 into chamber 42. A motor 43 and circulating fan 44 connected thereto, function to move the air through the display device by passing it down through screen 46 into the lower air ducts or passageways 47 which connect with the side air ducts or passageways 27 through screens 48 and allow the air to pass to the top part or element 20 of the container through screens 49. Any suitable type of fan may be employed to accomplish the foregoing air movements. A suitable centrifugal type of fan functions to draw in the air from parts of chamber 42 and expel it over and through opening 46, even though some of the air from the fan recirculates within the chamber 42. Usually the fan is of slow speed so as to gently move the air as a high speed stream of air is not needed for this type of operation.

In this display hatcher, it is desired to provide a suitable automatic controls for providing heat and moisture to the circulating air. Any one of the commercial thermostats well known in heating controls may be employed, and in the structure herein shown, a heating element 50 is included in the cage of circulating fan 44, as shown in dotted lines. The power supply to the heating element and the make and break circuit thereof are not shown. They do, however, constitute the control so that proper heat will be supplied to the circulating air and provide uniform heating within the container 18.

Likewise, a commercial form of humidostat (not shown) is included for controlling the amount of moisture in the air that issues from the openings 26 of the display hatcher. It is preferred that the humidostat keep the relative humidity at about 85 percent.

When the animals hatched from the eggs are ones which have a down coating or covering, it has been found desirable to screen the circulating air, and as noted above, screens 41, 46, 48 and 49 have been provided so that the air which reaches the transparent element 20 will be free, or substantially free, of any animal down. It has been found that some of the down from the animals hatched will engage the water in pan 38 and in some instances it may be desirable to remove some of this down from the water at intervals so that the proper amount of moisture will be added to the passing air.

When textile material, such as cloth or burlap, or the like, is moistened by water and is used for moisturizing or humidifying the air passing therethrough or thereagainst, it has been found that a sizeable area would be required as the down from the animals, in many instances, clogs the fabric, and the capillary attraction of the fabric would not pull up enough water to properly moisturize the air. It has been found that the pan of water 38 is a quick and easy manner of properly moisturizing or humidifying the circulating air even with animal down being present.

It is always desirable that a certain amount of the circulating air flow out of the container and that a certain amount of fresh air be drawn in, and for this purpose, an exit opening 51, Fig. 4, is provided near the base of the hatcher. A suitable screen 52 is provided at this opening. The intake air passes through opening 53 which is provided with a screen 54. It is preferred that the intake be made in door 56 which is mounted on hinges 57 that permit entrance into the lower part 19 of the hatcher for purposes of repairing, adding water, and replacing any necessary screens, especially screen 41, and for making any other additions or subtractions of items to the interior of this display hatcher.

It will be noted that the preferred form of hatcher herein functions to bring animal life into being from eggs and that the heated circulating air passes over the eggs, down around the sides thereof, and through the perforations in the bottom of the trays. This gives the type of down heating to the eggs that is natural with setting hens, ducks and like animals during their normal setting time.

It will also be noted that suitable mechanisms and air ducts are provided for circulating the air and for heating it uniformly and for keeping it properly moisturized.

In the case of hatching small chicks, it is usual for them to begin to peck at the shell and break it on about the 19th day of incubation, and to thereafter break the shell away from themselves, and to then be heated by the air to become dry and to move around. The small air space in an egg shell before the shell is broken gives sufficient air for the chick until it breaks the shell and breathes from the circulating air.

It will further be noted that this display hatcher or device is of improved construction which allows persons to stand around all sides of it and observe the bringing of animal life into being from eggs, and at the same time the display hatcher or unit provides audible amplification so that the observes watching the hatching will hear all of the little or low audible noises developed during hatching. Both the observation and the sound are very important features for educational purposes of adults and especially of children.

In view of the fact that the hatching takes place twenty four hours a day and that adults and children are interested at any time in watching the hatching, it is desired to provide a suitable form of light for illuminating the eggs and chicks as they hatch. The object is to light the trays without adding heat to the circulating air.

The construction of the display device may be of any desired material formed in any particular fashion. Preferably wood and wood frames are employed. It is understood that plastics, metals and other material may be substituted for the wood. In some instance, insulating boards may be substituted for the wood, or insulation material may be affixed to the wood or frame forming the display hatcher. Plywood is one of the materials that is easily applicable to form the improved display hatcher herein.

In this application, the terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

The invention claimed is:

1. In a display hatcher, the combination of an upper and lower two-part container, a tray for holding eggs and adapted to be temporarily placed near the top of the lower part of said container, a transparent member forming the upper part of said container and being positioned above said tray to allow observation of the actual hatching of the eggs on said tray, air passageways for guiding air within said container, a heater for heating said air, a wet fluid moisturizing the air flowing over said water fluid, air propelling means for moving said air within said container, a sound pick-up element positioned within said container for picking up low volume sounds, and a sound amplifying means outside of said container and connected to said pick-up element for amplifying for the observer the several noises made within said container during actual hatching to thereby have the observer appreciate all of the hatching by noting both the movements and sounds of the animal being hatched.

2. In a display hatcher, the combination of an upper and lower two-part container, a plurality of trays for holding chicken eggs and adapted to be temporarily placed in said container for hatching said eggs, one of said trays adapted to be removed at the end of a predetermined period to thereby allow a new tray of eggs to be inserted, a transparent member forming the upper part of said container and being mounted on the top thereof for allowing observation of actual hatching and for directing the flow of air onto said eggs for hatching the same, a moisture holder positioned below said trays for having substantially all of said air move in contact therewith to absorb moisture, the lower part of said container having air passageways formed therein, an air moving means for moving said air through said passageways, a heater for heating said air, screens through which said air must pass to remove freed chicken down, said lower part of said container having relatively small openings therein for allowing relatively small amounts of fresh air to be added and for exhausting some of the air in said hatcher.

3. In a display hatcher, the combination of an upper and lower two-part container, a plurality of trays for holding eggs and adapted to be temporarily placed in said container for hatching said eggs, one of said trays adapted to be removed at the end of a predetermined period from said container to thereby allow a new tray of eggs to be inserted, a transparent member forming the upper part of said container and being mounted near the top of the lower part thereof for allowing observation of actual hatching and for directing the flow of air onto said eggs for hatching the same, a moisture holder positioned below said trays for having substantially all of said air move in contact therewith to absorb moisture, the lower part of said container formed to provide air ducts for guiding air through said lower part of said hatcher, an air moving means for moving said air through said ducts, a heater for heating said air, screens through which said air must pass, said container having a relatively small opening formed in the lower part thereof for allowing the addition of fresh air, and a relatively small opening for allowing the exhausting of used air, a sound pick-up means positioned within said container, and a sound amplifying means outside of said container and connected to said pickup means for amplifying for the observer the several noises made within said container during actual hatching to thereby have the observer appreciate the hatching by noting both the movements and sounds of the chicks when hatching.

4. In a display hatcher, the combination of an upper and lower two-part container, a plurality of perforated trays for holding eggs and adapted to be temporarily placed in said lower part of said container for hatching said eggs, one of said trays adapted to be removed after a period approximately thirty hours to thereby allow a new tray of unhatched eggs to be inserted, a transparent member forming the upper part of said container and being mounted on the top thereof for allowing observation of actual hatching and for directing the flowing of air onto said eggs for hatching the same, a pan containing water positioned below said trays for having substantially all of the air flow in contact therewith to absorb moisture, said container being constructed to form air passageways therein for guiding air through the lower part of said container, a fan means for propelling said air through said passageway, and electrical heater means for heating said air, and screens through which said air must pass to remove the down in the air stream, the lower part of said container having a relatively small opening for allowing the exhausting of air which has been in said container and a relatively small opening in said lower part container for adding fresh air.

5. In a display hatcher, the combination of an upper and lower two-part container, a plurality of trays for holding chicken eggs and adapted to be temporarily placed in said lower part of said container for hatching said eggs, partitions between said trays and extending in height above said trays to prohibit most of the chicks from moving from one tray to another tray, one of said trays adapted to be removed each day to thereby allow a new tray of eggs to be inserted, a transparent member forming the upper part of said container and mounted near the top thereof for allowing observation of actual hatching and for directing the flow of air onto said eggs for hatching the same, a moisture holder positioned below said trays and being equidistant below all of said trays for having substantially all of the air move in contact therewith to absorb moisture, the lower part of said container being constructed to form passageways for the flow of air through said lower part and to said upper part and over the eggs, a fan for moving said air through said passageways, an electric heater for heating said air in predetermined intervals, and screens through which said air must pass for removing some of the chicken down, said lower part of said container having relatively small openings therein for allowing fresh air to be added to the air stream and for exhausting some of the air in the air stream.

6. In a display hatcher, the combination of an upper and lower two-part container, a transparent element being a closure for the upper part of said hatcher, said element being curved to act as a guide for warm air flowing from the lower part of said hatcher, holder pieces mounted near the top of said lower part, movable perforated trays assembled on said holder pieces, said trays having eggs therein and having the warm air flow over the eggs and through said perforations, second holder pieces positioned a short distance below said egg trays in said lower part of said hatcher, a moisture holder mounted on said second holder pieces for having the warm air pass thereover to collect some moisture, a compartment formed below said second holder pieces in said lower part of said hatcher, a screen in one portion of said compartment through which said warm air flows, said screen also acting to arrest the flow of some of the particles in the warm air stream, said compartment forming air passageways with said lower part of said hatcher for guiding the flow of the warm air to said upper part of said hatcher, an air moving means mounted in said lower part of said hatcher for moving the air through said hatcher, and a heater for heating the air during predetermined periods.

7. In a display hatcher, the combination of an upper and lower two-part container, a transparent element being a closure for the upper part of said hatcher, said element being curved to act as a guide for warm air flowing from the lower part of said hatcher, holder pieces mounted near the top of said lower part, movable perforated trays assembled on said holder pieces, said trays having poultry eggs therein and having the warm air flow over the eggs and through said perforations, second holder pieces positioned a short distance below said egg trays in said lower part of said hatcher, a pan of water mounted on said second holder pieces for having the warm air pass thereover to collect some moisture and to catch some of the poultry down, a compartment formed below said second holder pieces in said lower part of said hatcher, a screen in one portion of said compartment through which said warm air flows, said screen also acting to arrest the flow of some of the poultry down in the warm air stream, said compartment forming air passageways with said lower part of said hatcher for guiding the flow of the warm air to said upper part of said hatcher, a fan means mounted in the lower part of said hatcher for moving the air through said hatcher, and a heater for heating the air during predetermined periods, said lower part of said hatcher being provided with two relatively small openings one of which admits fresh air to the air stream and the other allows the exhausting of some of the air in the air stream.

8. In a display hatcher, the combination of an upper and lower two-part container, a transparent element being a closure for the upper part of said hatcher, said element being curved to act as a guide for warm air flowing from the lower part of said hatcher, holder pieces mounted near the top of said lower part, movable perforated trays assembled on said holder pieces, said trays having poultry eggs therein and having the warm air flow over the eggs and through said perforations, second holder pieces positioned a short distance below said egg trays in said lower part of said hatcher, a pan of water mounted on said second holder pieces for having the warm air pass thereover to collect some moisture and to catch some of the poultry down, a compartment formed below said second holder pieces in said lower part of said hatcher, a screen in one portion of said compartment through which said warm air flows, said screen also acting to arrest the flow of some of the poultry down in the warm air stream, said compartment forming air passageways with said lower part of said hatcher for guiding the flow of the warm air to said upper part of said hatcher, a fan means mounted in the lower part of said hatcher for moving the air through said hatcher, a heater for heating the air during predetermined periods, said lower part of said hatcher being provided with two relatively small openings one of which admits fresh air to the air stream and the other allows the exhausting of some of the air in the air stream, and a sound pickup means mounted on the wall of said transparent element near its uppermost height for picking up low volume sounds, and a sound amplifying means outside of said pick-up element for amplifying for the observer of several noises made within said container during actual hatching to thereby have the observer appreciate the hatching by noting both the movements and sounds of the poultry when hatching.

WALTER A. KETAY.

REFERENCES CITED

The following references are of record in the file of this patent:

UNITED STATES PATENTS

| Number | Name | Date |
|---|---|---|
| 931,142 | Perkins et al. | Aug. 17, 1909 |
| 1,693,756 | Jordan | Dec. 4, 1928 |
| 1,943,575 | Abendroth | Jan. 16, 1934 |
| 1,976,159 | Bridge | Oct. 9, 1934 |
| 2,026,801 | Ross | Jan. 7, 1936 |